United States Patent
Eielsen

(10) Patent No.: US 6,581,629 B2
(45) Date of Patent: Jun. 24, 2003

(54) FLUID-ACTIVATABLE DEVICE FOR SHUT-OFF UNDER EXCESS FLOW CONDITIONS

(76) Inventor: Jan Inge Eielsen, Háhammarjeitet 3B, N-4045 Hafrsfjord (NO)

( * ) Notice: Subject to any disclaimer, the term of this patent is extended or adjusted under 35 U.S.C. 154(b) by 0 days.

(21) Appl. No.: 10/016,279

(22) Filed: Oct. 30, 2001

(65) Prior Publication Data

US 2002/0088871 A1 Jul. 11, 2002

Related U.S. Application Data

(63) Continuation of application No. 09/424,697, filed on Nov. 24, 1999, now Pat. No. 6,345,641.

(30) Foreign Application Priority Data

May 26, 1997 (NO) .............................. 19972386

(51) Int. Cl.[7] .......................... F16K 15/03; F16K 17/34; F16K 17/36
(52) U.S. Cl. ....................... 137/460; 137/521
(58) Field of Search .................... 137/80, 457, 460, 137/498, 521

(56) References Cited

U.S. PATENT DOCUMENTS

| 2,491,104 | A | * | 12/1949 | Garrison ..................... 137/460 |
| 3,293,389 | A | * | 12/1966 | Von Bhicknapahari ..... 137/460 |
| 3,672,630 | A | | 6/1972 | Naumburg et al. |
| 4,844,113 | A | | 7/1989 | Jones |

FOREIGN PATENT DOCUMENTS

DE 2026137 5/1970

* cited by examiner

Primary Examiner—Michael Powell Buiz
Assistant Examiner—Ramesh Krishnamurthy
(74) Attorney, Agent, or Firm—Knobbe, Martens, Olson & Bear, LLP

(57) ABSTRACT

A fluid-activatable shut-off device, configured as a shut-off valve, has a valve housing formed with a flow passage therethrough and a movably supported valve body, which is movable between an open valve position and a closed valve position. In the open valve position, the valve body is mainly withdrawn from the flow passage, which is thereby essentially cleared. In the closed valve position, the valve body blocks the flow passage. The valve body is arranged to close the valve by abnormal flow conditions by a portion being formed so that the flowing fluid provides a lifting force which affects the valve body and seeks to move it towards the closed position. The valve body may thereby close by an abnormal increase in the fluid flow rate, density or viscosity. The portion may also be supported by an expansion pad arranged to push the lifting surface further into the flow passage as a consequence of changes in the fluid pressure and/or temperature, thereby providing increased lift so that the valve body closes. The valve portion is equipped with plugs for sequentially shutting off the choke channels to the flow of hydraulic/pneumatic fluid between the chambers to thereby control the closing speed of the valve body so that surges is avoided in the pipe system in which the valve is installed.

4 Claims, 2 Drawing Sheets

FLUID-ACTIVATABLE DEVICE FOR SHUT-OFF UNDER EXCESS FLOW CONDITIONS

This application is a continuation of prior application Ser. No. 09/424,697, filed on Nov. 24, 1999 U.S. Pat. No. 6,345,641 B1.

FIELD OF THE INVENTION

The present invention relates to a fluid-activatable shut-off device in an embodiment as a shut-off valve or damper for the complete or partial blocking of the flow passage. The shut-off device may generally be used in an embodiment as moveable dampers, profiles or similar installed in pipes, channels or other flow passages with the object of arranging a damper/profile in the fluid flow in the desired position by using energy present in the flow passage. The invention used in an embodiment as a valve, comprises a valve housing formed with a flow passage therethrough and a movably supported valve body, movable between an open valve position, in which the valve body is mainly withdrawn from the flow passage, which is thereby essentially cleared, and a closed valve position, in which the valve body blocks the flow passage and closes the valve.

SUMMARY OF INVENTION

The valve according to the invention is generally meant to be mounted into a pipeline, a channel or similar, which carries a fluid (air, water, oil or other liquid- or gaseous media). The valve body is in contact with the flowing fluid and is subjected to compressive and frictional forces. The valve body is arranged to close the valve whenever said forces exceed predetermined values. The amount of the forces varies with the fluid pressure, fluid density, flow rate and viscosity.

The valve is particularly meant to allow shut-off of a liquid or gas flow which intentionally or erroneously is brought to exceed a predetermined upper rate.

The lifting surface of the valve is generally related to the parameters that are influential, according to the formula: Shut-off:

The formula for lifting force: $L = 1/2 \cdot C_L \cdot \rho \cdot A \cdot V^2$

In which:
L Lifting force
$C_L$=Coefficient (empirical, expresses frictional properties of the lifting surface versus fluid rheology)
$\rho$=Fluid density (influenced by pressure, temperature and fluid compressibility)
A=Surface area (effective lifting surface)
V=Fluid flow rate Abnormal flow conditions of a flowing fluid arise in connection with, among other things, pipeline breaks which may be caused by accidents such as explosions, fires and the like, in which abnormal flow conditions of the fluid may contribute to, among other things, greater amounts of undesired liquid/gas being supplied to a possible fire condition.

Generally, the present invention aims at utilizing a changed flow rate and perhaps also changed viscosity/temperature/pressure by abnormal flow conditions in a flowing fluid.

According to the invention, it is thereby aimed at eliminating the need for external force by utilizing the kinetic (and perhaps the hydraulic, rheologic and thermal) forces which are already present in the pipeline/channel, the valve body being formed to respond to changes in said forces and close the valve by abnormal flow conditions arising.

In the immediate following are defined some applications of the fluid-activatable shut-off device according to the invention. The applications defined only represent non-limiting examples.

Accidents at sea-based oil/gas installations have demonstrated how important it is to have the enormous gas and oil reservoirs present in the transport line network under control. To a certain degree the current technology manages to is control pressure and transport of inflammable gases or liquids in the pipelines, but situations do occur, in which the valves will be of no use, as breaks in pipelines immediately upstream from a valve may release large or small reservoirs present in the pipeline downstream of the preceding valve. Prior to a possible pipe line break, the valves will be open to allow transport of fluid through the pipeline. By closing the valve it will be possible to restrict an oil or gas emission, fire or risk of an emergency situation escalating. This is an operation which will often take a certain amount of time and in some cases such an amount of time that it will be too late for contributing to significantly limiting the damage.

In an accident of fire or other emergency situation at sea-based installations it is important to have the liquid flow in the pipe systems carrying explosive/inflammable liquids, under control.

Today, the liquids in the transport pipe network in the North Sea are mainly controlled by means of so-called subsea valves which are positioned in central intersections in the pipeline network and/or by means of valves placed in the immediate vicinity of the platforms (at arrival or despatch from the platforms). This entails that large reservoirs of gas or liquids may be exposed to explosion, strong heat or other strain which may entail a break in the pipe system aboard the platform. The only alternative known is then to bleed off pressure, but this relieving of pressure may take from a few hours up to days. In processing plants situations corresponding to those described above might occur by a pipeline breaking at a location in which there is no barrier against reservoirs of gas or inflammable liquid.

Subsea valves currently used are based on the use of an actuator and on the latter being shipped out to the valve. Aboard the platform the so-called sea-line valves are connected to the operation shut-down system of the platform, and are closed automatically on alarm signals. In an emergency situation a subsea valve may, for example, not be closed quickly enough to prevent hydrocarbons from being supplied to the accident situation aboard the platform, because it takes too long time to operate the valve. Hydraulics pack and actuator must be shipped across and connected to the subsea valve for this to close. A sea-line valve is normally placed somewhat within the platform edge, which entails that parts of the transport pipeline may be exposed to fire, explosion, falling loads or similar without the possibility of being able to close the valve by breaks on the seaward side. Large reservoirs of hydrocarbons, oil and/or gas may then be released on the platform and contribute to the escalation of the accident.

In the above valve applications a shut-off valve according to the invention may be used with advantage, because it is arranged to respond to abnormal flow conditions occurring in situations of accidents such as major leaks, fire, explosions, in which the valve provides a quick but controlled shut-off.

The constructive features enabling a shut-off valve according to the invention to respond to an abnormal flow condition of the flowing fluid and thereby effecting forced closing, will be explained after the applications having been defined.

Another application in which the method according to the invention may be used with advantage, is in connection with ventilation of residential houses. Strong wind will cause a draught through open valves. By mounting the valve according to the invention in valve slots in windows and/or ordinary rectangular valves, the windward valve will close while the leeward valve opens and stays open. The dominant pressure inside the house will consequently be a negative pressure. This is will have a favourable effect as to the draught conditions in the house and the drying out of the wall material of the house. According to the invention, the valve will also have a favourable effect during the development of a possible fire. The fire will require oxygen in its initial phase. The oxygen is brought to the fire through openings such as doors, windows, valves and other leaks in the house. As the fire inhales, the valve will respond to increased air flow through the valve into the house by closing. By heat developing, the air expands and causes a flow of air and flue gases out of the house.

Another application in which the valve according to the invention may be used with advantage, is in connection with explosion dampers. An explosion erects pressure waves and will increase the air/gas flow through ventilation channels or other openings in the building construction, also where it is desirable to prevent the fire from spreading. According to the invention the valve will instantly respond to the pressure wave caused by the explosion, and close, thus preventing undesirable spreading of the fire.

Another application in which the valve according to the invention can be used with advantage, is in connection with ridge roofs on houses. Gale-effected damage, through roofs being blown off the house in a gale, is caused by negative pressure on the leeward side of the roof and positive pressure building up at the same time on the windward side and, relatively, inside the house. By mounting valves according to the invention in both roof faces of a ridge roof, the pressure inside the house is controlled by the fact that the windward valve closes and the leeward valve opens or remains open. The pressure inside the house will thereby seek to adopt the same level as the pressure on the leeward side of the roof, and this entails that the lifting effect on the ridge roof decreases. By mounting valves in all valve slots the same effect will be achieved for the house in general.

In public waterline network, there are large reservoirs of water, which, on pipelines breaking, may cause great water damages and destructions. Time for the operation of shut-off valves is critical here to limit the damages.

Conventional manually manoeuvrable ball and butterfly valves are used, which depend on personnel being alarmed as soon as possible in an emergency situation. The time aspect in the operation of these known shut-off valves may thus constitute an essential problem with regard to limiting damages as a consequence of water leakage.

Shut-off valves according to the invention may be employed with advantage in this case. The valve according to the invention is arranged to enable normal throughput in normal flow conditions for the water in the pipeline. By a possible break in a water line, subsequent damage will be limited by the valve according to the invention closing automatically because of the accelerated flow rate of the water resulting from the abnormal flow conditions due to the pipeline break. Valves according to the invention could conceivably also be used in branch lines to a house or at definite places in the house to limit water damage by a possible pipeline break. The valve may also conceivably be used in connection with a garden hose with pertaining valves and equipment.

Available energy in a pipe/channel system is the kinetic energy and the potential energy in the form of pressure/pressure differences.

To close a known shut-off valve which is mounted within a pipeline/pipeline system in which a fluid is flowing in abnormal fluid conditions, such as an abnormal fluid flow rate, abnormal pressure and/or temperature, there must be provided in the pipeline/pipeline system, upstream from the shut-off valve, a fluid rate indicator, a pressure gauge and a thermometer, which are possibly monitored audiovisually, followed by manual closing of the valve at critical parameter values, or the respective meters are connected to an actuator which acts as valve closing device, and which is arranged to close the shut-off valve as a consequence of, for example, an extraordinary deflection of the pointer of said meter activating the actuator, which thereby becomes effective and closes the shut-off valve.

The object of the invention has been to utilize changed fluid flow rate and possibly also changed viscosity/temperature/pressure in abnormal flow conditions of a flowing fluid, directly for the automatic closing of the valve in a safe and controlled manner and at a very early moment in the initial phase of the abnormal flow condition.

Thus, the invention relates to a fluid-activatable shut-off device used in a shut-off valve intended for mounting into a pipe/pipeline/channel carrying a fluid. The fluid may be in the form of liquid or gas. The valve comprises a valve housing formed with flow passage, which in the mounted state of the valve is brought to correspond with the pipe bore or channel of the pipeline etc. The flow passage may in principle be of any cross-sectional shape (circular, oval, polygonal, square etc.), but it will preferably have the same cross-sectional shape and size as the pipeline/channel to which it is arranged. In a known manner the valve further comprises a movably supported valve body pivotal between the open valve position, in which the valve body is essentially withdrawn from the flow passage thereby being mainly cleared, and a closed valve position, in which the valve body directly blocks the flow passage and closes the valve.

One aspect of the invention involves a fluid-activatable shut-off valve. The shut-off valve includes a valve housing, which has a flow passage therethrough of a predetermined cross-sectional shape, and a valve body. The valve body has a portion projecting into the flow passage and is supported by the valve housing. The valve body is moveable between an open valve position, in which the valve body allows fluid flow, and a closed valve position, in which the valve body blocks the flow passage. In the open position, the portion of the valve body is subject to a flow of a fluid passing through the flow passage in a predetermined flow direction. In response to abnormal flow conditions in the predetermined flow direction of the fluid in the flow passage, the portion is affected by at least one of increased fluid flow rate and changed fluid density so as to move towards the closed position and to close the valve.

In order to favour the defined objects, which generally is to enable the automatic closing of the valve as a consequence of an abnormal flow condition of the fluid carried by the pipeline, channel or similar, in which the valve is mounted, and whereby said abnormal fluid condition may be constituted by the fluid flow rate and perhaps also viscosity which is an important parameter in the interaction with the friction between the lifting surface and the fluid and/or pressure and temperature affecting the density of the fluid, the valve body according to the invention is formed and supported so that in the open position of the valve, it projects into the flow passage by a relatively small portion, which is thereby subjected to the flow of a fluid passing through the flow passage in a particular direction of flow when the valve is open. This portion of the valve body, projecting into the flow passage when the valve is open, is arranged to respond to abnormal flow conditions of the fluid in the flow passage, so as to be influenced by increased fluid flow rate, changed fluid viscosity and/or temperature, so that the portion and thereby the complete valve body is caused by the fluid to move towards the closed position.

Said portion projecting into the flow passage of the valve body, the so-called "lifting portion", preferably has a convexly curved or angled extent at the upstream end. When fluid flows past the lifting surface of the lifting portion, a lifting movement is initiated, which seeks to move the valve body towards the closing position. The form, weight and support of the valve body are arranged so that fluid flowing normally, will not provide sufficient lifting to initiate a closing movement.

To make the valve more sensitive to pressure and temperature, an expansion pad sensitive to pressure and/or temperature may be provided, which, influenced by pressure loss and/or temperature increase, expands so that the front edge of the lifting surface is moved further into the fluid flow, thereby being more exposed in the fluid flow and increases the lifting force across the lifting portion, which results in an earlier time of closing.

What is required for closing the shut-off valve according to the invention, is an abnormal flow condition such as explained above. The lifting portion of the valve body projecting into the flow passage, is, because of its position in the open position of the valve and its configuration (convexly curved and/or angled at the upstream end—relative to the flow direction of the fluid), respectively, in a stand-by position, in which it can very quickly respond to, for example, an increased fluid flow rate caused by a pipe break or other leak.

The lifting portion of the valve body directed towards the flow passage may be adapted in terms of friction to the fluid, the influence of the fluid on said lifting portion and thereby on the valve body, besides the fluid flow rate/properties (viscosity), also being depending on the surface curvature and surface friction of the lifting portion. By changing the flow rate, density or viscosity properties of a liquid, it is possible to control/regulate the closing moment of the valve: These are properties of the valve that allow the control of the liquid flow in a pipe system to be based on the utilization of these parameters to operate the valve. Hover, in most applications of the shut-off valve according to the invention its inherent properties are utilized to respond to a particularly abnormal fluid flow rate.

The valve body is formed as a section of the pipe wall which forms a tongue-like body placed in a semi-bored cylinder, which cylinder is placed transversely in relation to the flow direction of the fluid flowing therethrough. The valve body is received by a valve housing which encloses the lower cylinder half of the valve body. The valve housing is equipped with a prismatic body having channels or similar therethrough, to bring hydraulic fluid from one chamber to another during the closing process of the valve. This arrangement is provided in the valve to control the closing movement, so that shock waves are avoided in the pipe system. After an initial swinging up of the valve body, the closing speed will be determined by how quickly the hydraulic fluid is brought from one chamber to the other.

Said channels thereby provide for bringing hydraulic fluid/pressure between the two chambers. At the same time the channel will represent a throttle organ from the flow passage between the chambers, so that a desired restriction of the closing speed of the valve body is achieved by the fact that the entering of fluid into the chamber is throttled. As the closing function of the valve is in process, the pressure difference forces which effect the final part of the closing, take over.

In valves, in which great closing speed does not imply any risk of shock waves in pipe systems causing damages, there will be no need for the braking mechanism for the closing speed as described above. In such cases it will be sufficient with a damper equipped with the lifting portion prescribed.

BRIEF DESCRIPTION OF THE DRAWINGS

The invention is explained in further detail in the following in connection with a non-limiting example of a presently preferred embodiment, with reference to the drawing, in which.

DETAILED DESCRIPTION OF THE INVENTION

Figure 1:
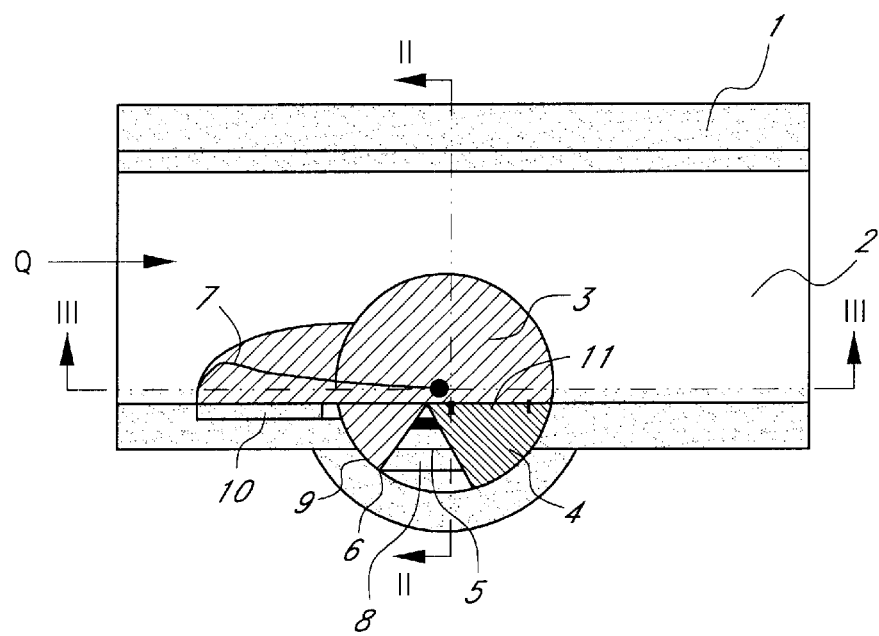
FIG. 1 shows a vertical cross-section through a shut-off valve formed in accordance with the present invention, along the line I—I in FIG. 2.
Figure 2:
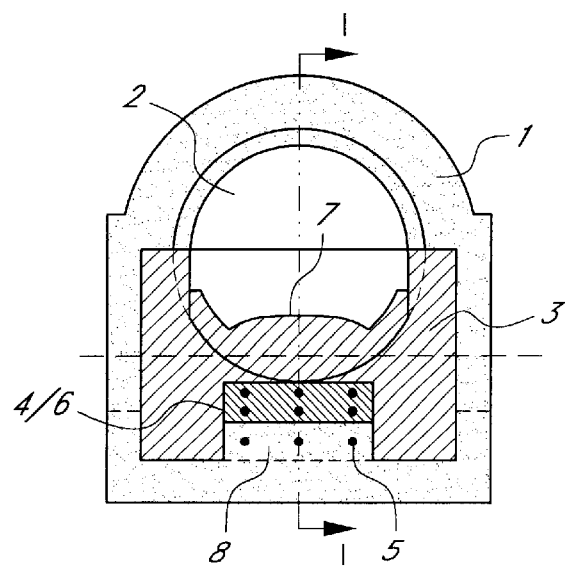
FIG. 2 shows a vertical cross-section along the line II—II in FIG. 1.
Figure 3:
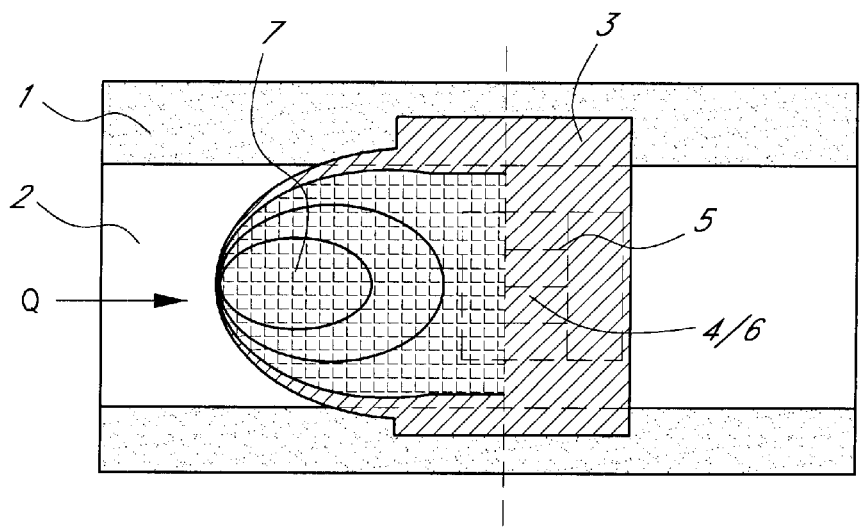
FIG. 3 shows a horizontal cross-section along the line III—III in FIG. 1.

Reference is made to the figures of the drawing, in which reference numeral 1 defines the valve housing in general. The valve housing is formed with a central flow passage 2 therethrough, which in the shown embodiment has a circular cross-section, but which may take any cross-sectional shape.

The lower portion of the valve housing is formed as a lying half cylinder transverse to the direction of flow in the valve. At the bottom of this cylinder seat is provided a prismatic body that defines hydraulic chambers in the open and closed position, respectively, of the valve. In the prismatic body 8 are bored communication channels 5 between the two hydraulic chambers 4 and 6, transporting hydraulic fluid from one chamber to the other in the closing and opening processes.

Figure 4:
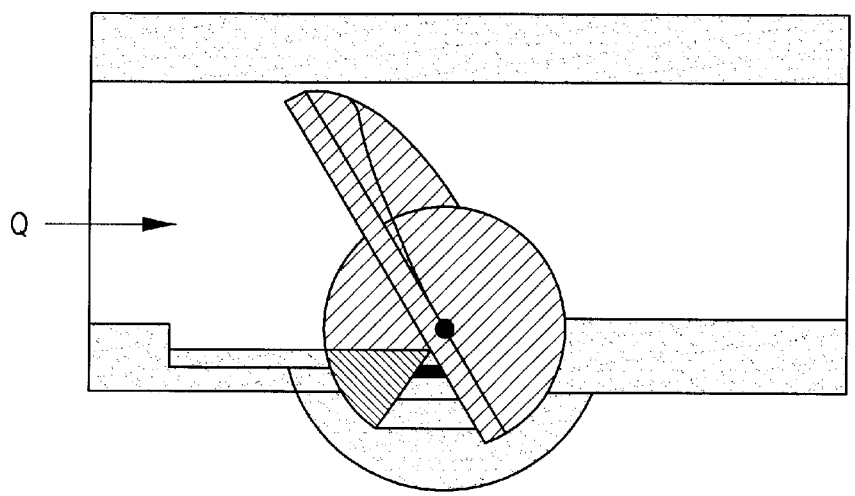
FIG. 4 shows a vertical cross-section through the shut-off valve in the closed position.

Lowermost, the valve housing 1 has an upwardly concave cavity 9 exhibiting a shape complementary to a cylinder-section, and a cylinder-section-shaped body portion corresponding thereto forming a part of the valve body 3. The body portion is formed in association with a laterally projecting tongue portion 7, the latter being formed to extend entirely across the flow passage 2 and, together with other portions of the body 3, to shut off the passage 2 completely in the closed position of the valve, as shown in FIG. 4.

The valve body 3 projects (relatively insignificantly) into the flow passage by an end portion 7, which has, according to FIG. 1, a convex curvature upstream (Q defines the flow direction of the fluid). Instead of this convex curvature which, together with the frictional coefficient of the end surface 7, is of importance to the function of the valve as the closing starts, the end portion—the so-called lifting portion or lifting surface portion respectively—could be formed with one or more angles.

In normal flow conditions in the flow passage 2, fluid flows in the direction Q at a normal flow rate, normal viscosity and normal pressure/temperature. The lifting portion 7 of the valve body 3 is subjected to the flow of fluid, but the lift is too small to move the valve body towards the closed position.

Whenever there is an abnormal flow condition resulting in an increased flow rate, changed viscosity and/or increasing temperature and/or falling pressure, these changes from normal to abnormal conditions of flow will result in a lifting of the lifting surface portion 7 of the valve body. Increased flow rate involves conditions of negative pressure in chamber 6 and positive pressure in chamber 4, which leads to the lifting portion lifting, thereby turning the valve body 3. Changed viscosity directly affects the lifting surface portion 7, whose radius of curvature and coefficient of friction at the surface contribute, likewise, to enhancing the lifting of the lifting portion 7.

A pressure and/or temperature expansion pad 10 may be positioned immediately below the tongue portion on the valve body. Pressure loss or temperature increase in the pipeline will then cause the tongue portion to project further into the flow channel 2 and provide increased lift.

The valve may also be brought to close by the use of an external source for transferring hydraulic fluid from chamber 4 to chamber 6.

After a preliminary lifting/turning of the valve body, the valve body 3 will move towards the closed position by means of the increased lift achieved by the lifting surface 7 to a greater extent being exposed into the flow passage 2. The closing movement will gradually be taken over by the pressure differential forces across the closing surface. These pressure differential forces also contribute to the valve staying closed until pressure equalisation is carried out on both sides of the closing section.

The opening of a closed valve is done by first equalizing the pressure on both sides of the valve body 3, whereafter the valve body 3 may return to its initial position. The valve body 4 may in a possible embodiment be configured, sized and arranged to drop back into the open position through gravity alone, or the valve body 3 may be brought to return by the passing of a plug through the valve in the direction contrary to the normal flow direction.

What is claimed is:

1. A fluid-activatable shut-off valve comprising:

a valve housing having a flow passage therethrough of a predetermined cross-sectional shape; and a valve body positioned within the valve housing and having a body portion and an end portion extending from the body portion, wherein the body portion and the end portion have surfaces that project into the flow passage, the valve body moveable between an open valve position, in which the valve housing supports the end portion and in which the valve body allows fluid flow from the end portion towards the body portion, and a closed valve position, in which the valve body portion and the end portion together block the flow passage, wherein in the open position, the end portion of the valve body is subject to a flow of a fluid passing through the flow passage in a predetermined flow direction from the end portion towards the body portion and along the surfaces of the end portion and the body portion, and in response to abnormal flow conditions in the predetermined flow direction of the fluid in the flow passage, the end portion is affected by a lifting force caused by at least one of increased fluid flow rate and changed fluid density so as to lift the end portion from the valve housing and to move the end portion towards the closed position to close the valve.

2. The fluid-activatable shut-off valve of claim 1, wherein the surface of the end portion has a convex curvature relative to the flow direction of the fluid.

3. The fluid-activatable shut-off valve of claim 1, wherein the surface of the end portion has an angled portion at an upstream end relative to the flow direction of the fluid.

4. A fluid-activatable shut-off valve comprising:

a valve housing having a flow passage therethrough of a predetermined cross-sectional shape; and a valve body positioned within the valve housing and having an elongate portion that extends from the valve body and that forms a continuous surface with the valve body, the valve body moveable between an open valve position, in which the valve housing supports the elongate portion, in which a surface of the elongate portion projects into the flow passage, and in which the valve body allows fluid flow through the flow passage and over the continuous surface, and a closed valve position, in which the valve body and the elongate portion block the flow passage, wherein in the open position, the elongate portion of the valve body is subject to a flow of a fluid passing through the flow passage in a predetermined flow direction along the continuous surface towards the valve body, and in response to abnormal flow conditions in the predetermined flow direction of the fluid in the flow passage, the elongate portion is affected by a lifting force caused by at least one of increased fluid flow rate and changed fluid density so as to lift the elongate portion from the valve housing and to move towards the closed position to close the valve.

* * * * *